US011481232B2

(12) United States Patent
Liu et al.

(10) Patent No.: US 11,481,232 B2
(45) Date of Patent: Oct. 25, 2022

(54) REGISTRY IMAGE MANAGEMENT

(71) Applicant: International Business Machines Corporation, Armonk, NY (US)

(72) Inventors: Hou Gang Liu, Xi'an (CN); Yu Xing YX Ren, Xi'an (CN); Guang Ya Liu, Xian (CN); Jin Chi JC He, Xian (CN); Dong Yu, Xian (CN); Peng XA Cui, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 16/925,384

(22) Filed: Jul. 10, 2020

(65) Prior Publication Data

US 2022/0012065 A1    Jan. 13, 2022

(51) Int. Cl.
| | |
|---|---|
| *G06F 9/00* | (2006.01) |
| *G06F 9/445* | (2018.01) |
| *H04L 67/00* | (2022.01) |
| *G06F 8/61* | (2018.01) |
| *H04L 67/01* | (2022.01) |
| *G06F 9/4401* | (2018.01) |

(52) U.S. Cl.
CPC .............. *G06F 9/4451* (2013.01); *G06F 8/63* (2013.01); *H04L 67/34* (2013.01); *G06F 9/4401* (2013.01); *H04L 67/01* (2022.05)

(58) Field of Classification Search
CPC ......... G06F 9/4451; G06F 8/63; H04L 67/34; H04L 67/42
USPC ............................................................ 713/1
See application file for complete search history.

(56) References Cited

U.S. PATENT DOCUMENTS

| | | | | |
|---|---|---|---|---|
| 6,157,415 A | * | 12/2000 | Glen ........................ | H04N 9/76 |
| | | | | 348/E9.057 |
| 6,661,906 B1 | * | 12/2003 | Kawade .................. | G06T 11/60 |
| | | | | 382/118 |
| 9,916,459 B2 | * | 3/2018 | Rueger ................. | G06F 21/602 |
| 10,684,884 B1 | * | 6/2020 | Emelyanov ......... | G06F 9/45558 |
| 2004/0268251 A1 | * | 12/2004 | Sadovsky .......... | H04N 1/32101 |
| | | | | 715/255 |

(Continued)

OTHER PUBLICATIONS

Disclosed Anonymously et al., "Method and Apparatus of Improving Container Images Pulling Efficiency in Distributed Container-based Cluster", An IP.com Prior Art Database Technical Disclosure, IP.com No. IPCOM000253319D, IP.com Electronic Publication Date: Mar. 22, 2018, 3 pages.

(Continued)

*Primary Examiner* — Volvick Derose
(74) *Attorney, Agent, or Firm* — Randy Tejeda

(57) ABSTRACT

An approach to managing images in a registry constructed as a multi-layer file system are disclosed. The method comprises receiving a first request for downloading a first image, the first request comprising a download policy. The method also comprises obtaining a plurality of compositions of layers of the first image, wherein content of layers specified by each composition of layers collectively constitute content of the first image. The method also comprises selecting a composition of layers from the plurality of compositions of layers of the first image based on the download policy. The method also comprises sending content of layers specified by the selected composition of layers.

17 Claims, 7 Drawing Sheets

(56) References Cited

U.S. PATENT DOCUMENTS

| | | | | |
|---|---|---|---|---|
| 2007/0192680 | A1* | 8/2007 | Morales | G06F 40/197 |
| | | | | 715/234 |
| 2018/0114025 | A1* | 4/2018 | Cui | G06F 21/577 |
| 2018/0276214 | A1* | 9/2018 | Chiba | H04L 67/2838 |
| 2018/0373517 | A1* | 12/2018 | Hu | G06F 8/60 |
| 2019/0250960 | A1* | 8/2019 | Zhang | G06F 9/5072 |
| 2022/0051116 | A1* | 2/2022 | Yu | G06N 20/20 |

OTHER PUBLICATIONS

Zhao et al., "Slimmer: Weight Loss Secrets for Docker Registries", 2019 IEEE 12th International Conference on Cloud Computing (CLOUD), ©2019 IEEE DOI 10.1109/CLOUD.2019.00096, 3 pages.
Zheng et al., "Wharf: Sharing Docker Images in a Distributed File System", of ACM Symposium on Cloud Computing, Carlsbad, CA, USA, Oct. 11-13, 2018 (SoCC'18), 12 pages, <https://doi.org/10.1145/3267809.3267836>.
Mell et al., "The NIST Definition of Cloud Computing", Recommendations of the National Institute of Standards and Technology, NIST Special Publication 800-145, Sep. 2011, 7 pages.

* cited by examiner

REGISTRY IMAGE MANAGEMENT

BACKGROUND

The present disclosure relates to multi-layer file systems, and more specifically, to managing images in a registry constructed as a multi-layer file system.

A container is a standard unit for packaging up code and associated dependencies so that code runs efficiently, quickly, and reliably from one computing environment to another. The container isolates code from the environment to ensure that codes work uniformly despite environmental differences. A container image (image) is a lightweight, standalone, executable package of software that includes everything needed to run an application: code, runtime, system tools, system libraries and settings. Images are composed of shareable and content addressable layers. A layer is a set of files, which are compressed in a single archive. Both images and layers are stored in a registry and accessed by clients, as needed, where the registry is constructed as a multi-layer file system.

SUMMARY

The present invention discloses a method in a registry constructed as a multi-layer file system. The method comprises receiving a first request for downloading a first image, the first request comprising a download policy. The method also comprises obtaining a plurality of compositions of layers of the first image, wherein content of layers specified by each composition of layers collectively constitute content of the first image. The method also comprises selecting a composition of layers from the plurality of compositions of layers of the first image based on the download policy. The method also comprises sending content of layers specified by the selected composition of layers.

The present invention discloses a computer system for managing images in a registry constructed as a multi-layer file system. The computer system comprises one or more computer processors, a memory coupled to at least one of the computer processors; and a set of computer program instructions stored in the memory and executed by at least one of the computer processors in order to perform actions of the above method.

The present invention discloses a computer program product for managing images in a registry constructed as a multi-layer file system. The computer program product comprises a computer readable storage medium having program instructions stored thereon, the program instructions executable by one or more computer processors to cause the one or more computer processors to perform actions of the above method.

DETAILED DESCRIPTION

Figure 1:
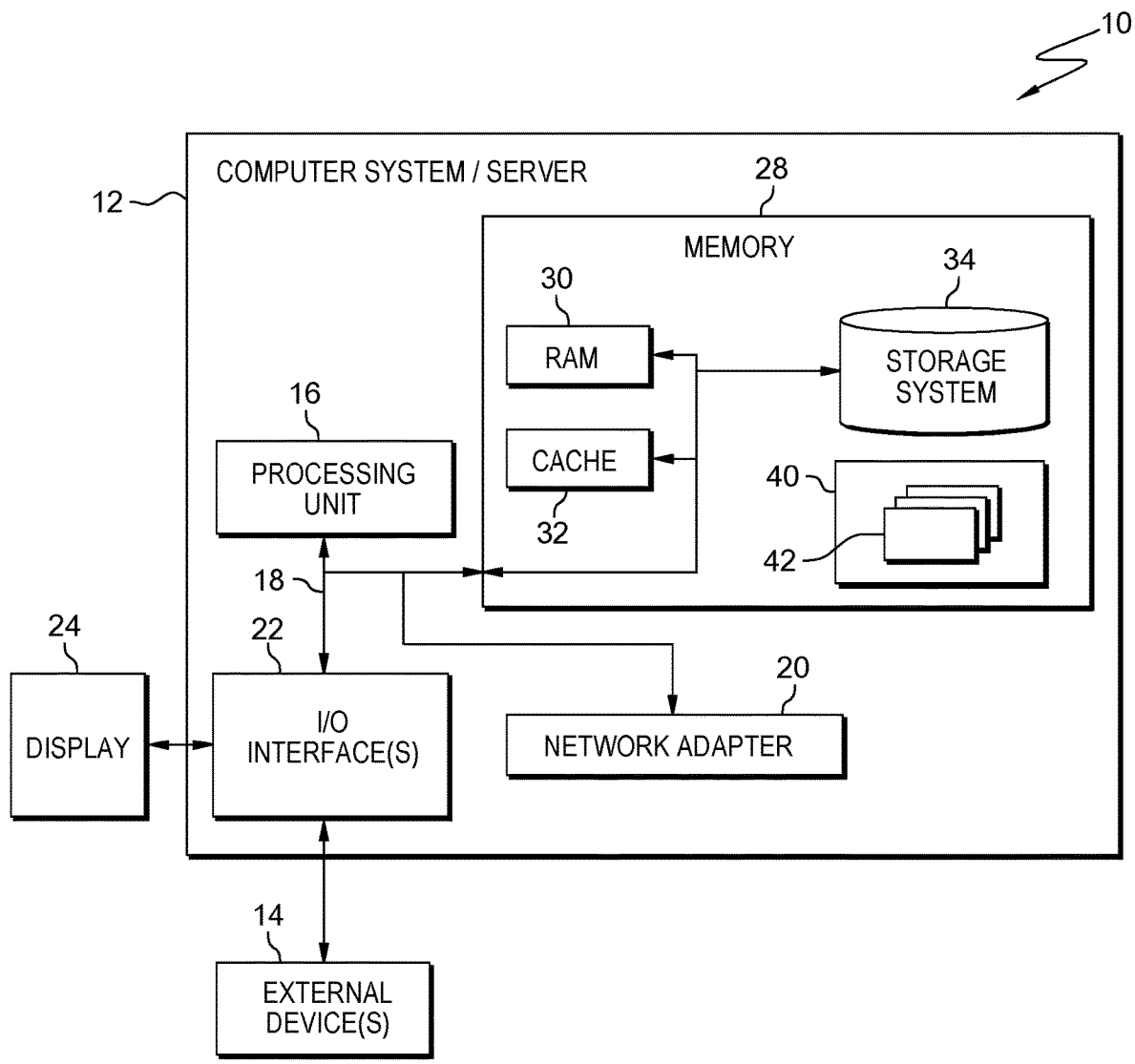
FIG. 1 depicts a cloud computing node according to an embodiment of the present disclosure.

Embodiments of the present invention will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, however, implementation of the teachings recited herein are not limited to a cloud computing environment. Embodiments of the present disclosure are capable of being implemented in conjunction with any other type of computing environment now known or later developed. Implementation of embodiments of the invention may take a variety of forms, and exemplary implementation details are discussed subsequently with reference to the Figures.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service provider.

Broad network access: capabilities are available over a network and accessed through standard mechanisms that promote use by heterogeneous thin or thick client platforms (e.g., mobile phones, laptops, and PDAs).

Resource pooling: the provider computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors 16 (i.e., computer processors or processing units), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to, microcode, device drivers, redundant processing units, external disk drive arrays, RAID systems, tape drives, and data archival storage systems, etc.

The present invention may contain various accessible data sources that may include personal storage devices, data, virtual content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. The present invention provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. The present invention enables the authorized and secure processing of user information, such as tracking information, as well as personal data, such as personally identifying information or sensitive personal information. The present invention provides information regarding the personal data and the nature (e.g., type, scope, purpose, duration, etc.) of the processing. The present invention provides the user with copies of stored personal data. The present invention allows the correction or completion of incorrect or incomplete personal data. The present invention allows the immediate deletion of personal data.

Figure 2:
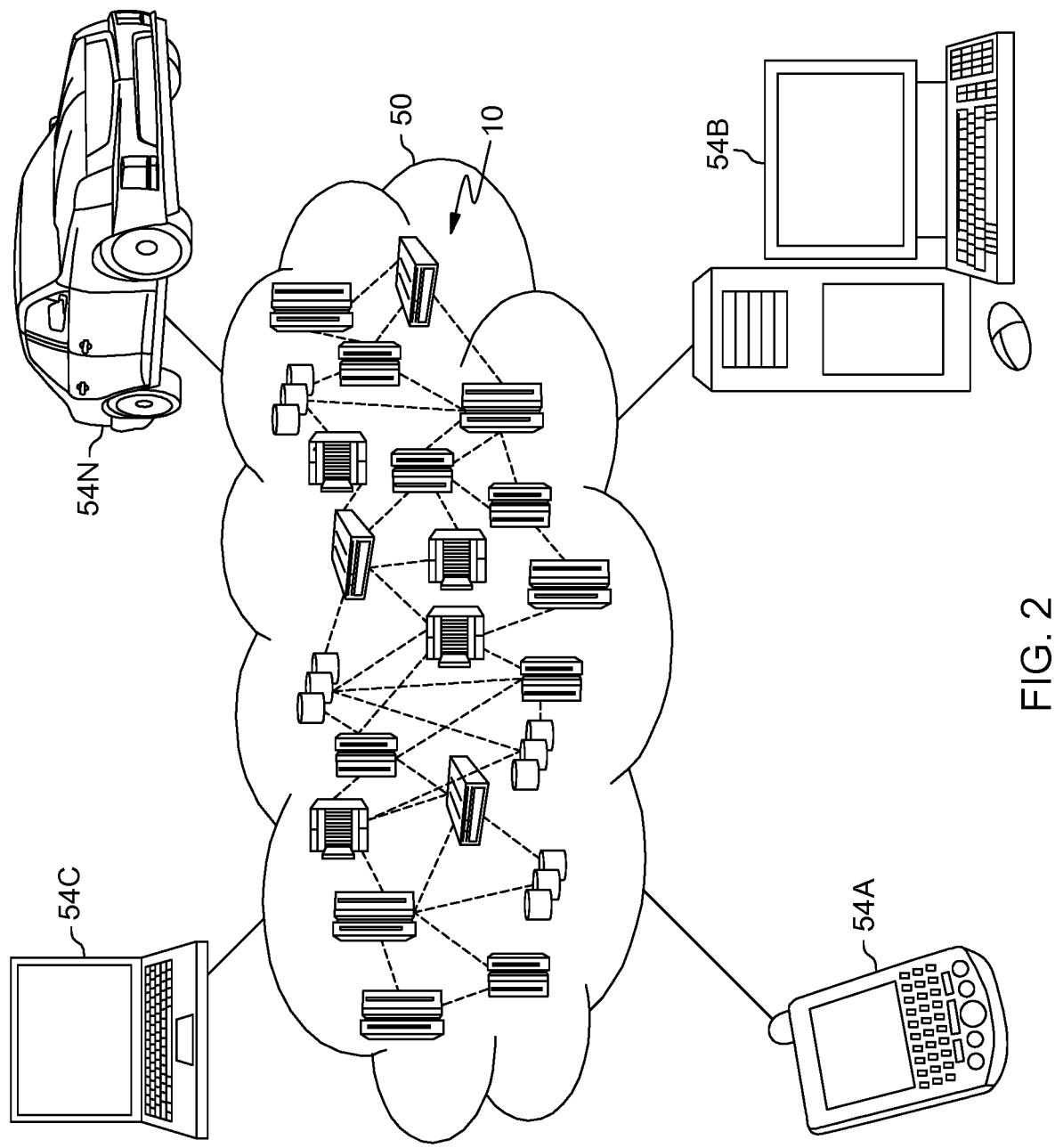
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. The nodes may be grouped (not shown) physically or virtually, in one or more networks, such as Private, Community, Public, or Hybrid clouds as described hereinabove, or a combination thereof, allowing cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
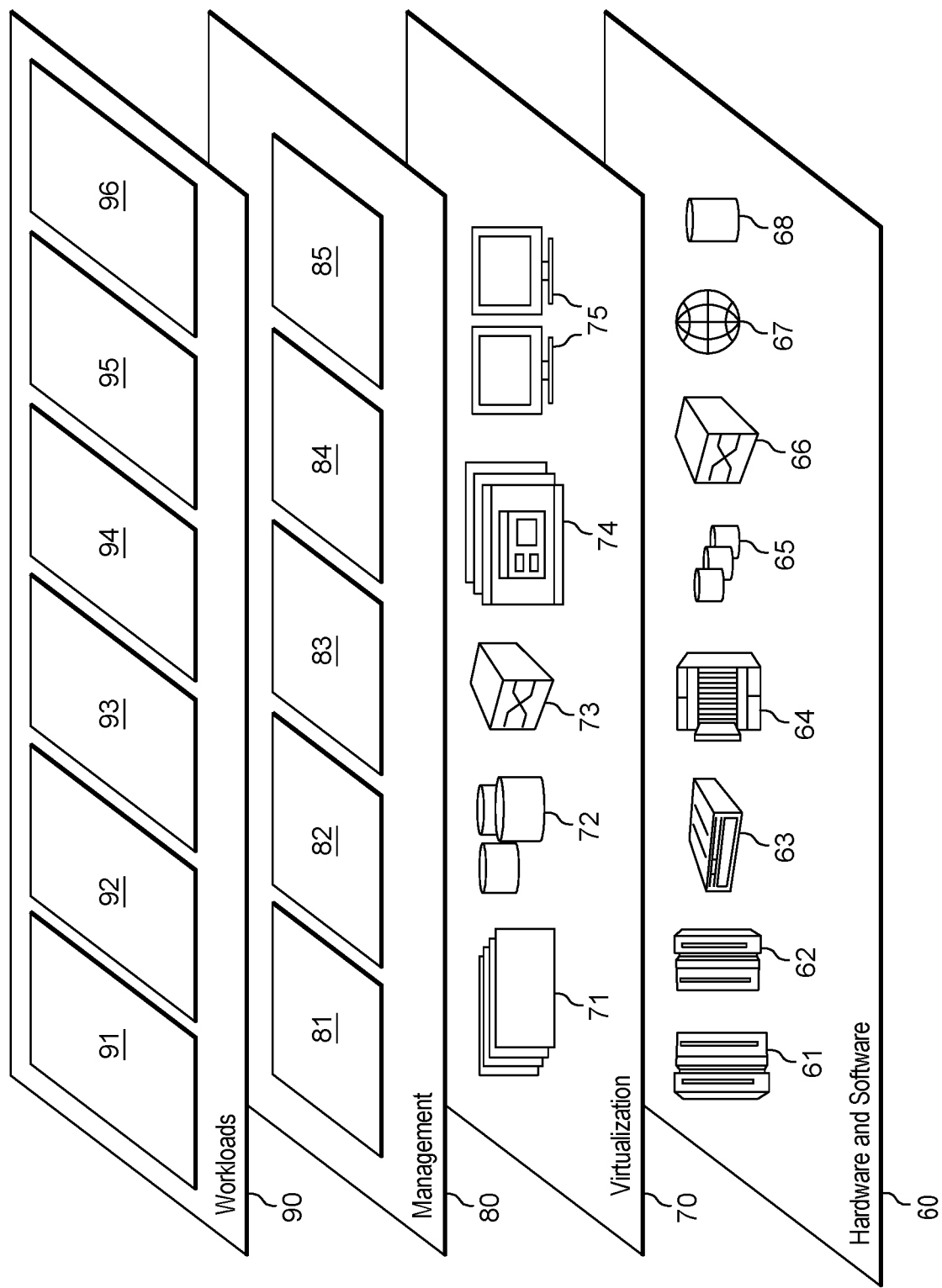
FIG. 3 depicts abstraction model layers according to an embodiment of the present disclosure.

Referring now to FIG. 3, a set of functional abstraction layers provided by cloud computing environment 50 (i.e., FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and policy-based image managing 96.

Currently, images are managed by a registry, which is constructed as a multi-layer file system. Images are composed of shareable and content addressable layers. A layer is a set of files, which are compressed in a single archive. Both images and layers are stored in registry and accessed by clients as needed. As layers are uniquely identified by a collision resistant hash of their content, no duplicate layers are stored in registry.

Figure 4:
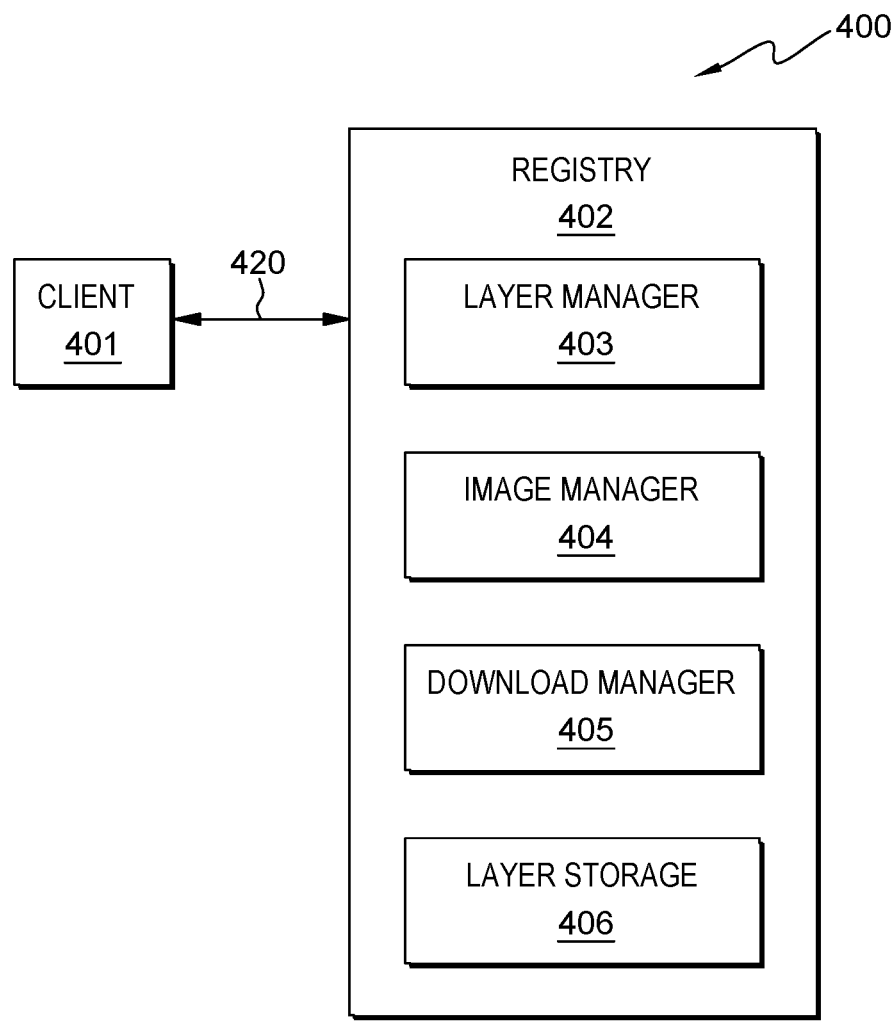
FIG. 4 depicts an exemplary usage environment of a multi-layer file system according to an embodiment of the present disclosure.

FIG. 4 depicts an exemplary usage environment 400 of a multi-layer file system according to embodiments of the present invention. Referring to FIG. 4, the exemplary usage environment 400 includes a client 401 and a registry 402. Client 401 and registry 402 are connected directly or indirectly via a communication network 420. A user may push (upload) images to registry 402 or pull (download) images from registry 402. Registry 402 may include a layer manager 403, an image manager 404, a download manager 405, and a layer storage 406.

The communication network 420 in FIG. 4 may include various types of communication networks, such as a wide area network (WAN), local area network (LAN), a telecommunication network, a wireless network, a public switched network and/or a satellite network. The communication network may include connections, such as wire, wireless communication links, or fiber optic cables.

Client 401 in FIG. 4 may be, for example, a mobile device, a telephone, a personal digital assistant, a netbook, a laptop computer, a tablet computer, a desktop computer, or any type of computing device capable of running a program and accessing a network. Client 401 and registry 402 may operate in a cloud computing service model, such as Software as a Service (SaaS), Platform as a Service (PaaS), or Infrastructure as a Service (IaaS). Client 401 and registry 402 may also be located in a cloud computing deployment model, such as a private cloud, community cloud, public cloud, or hybrid cloud.

Figure 5A:
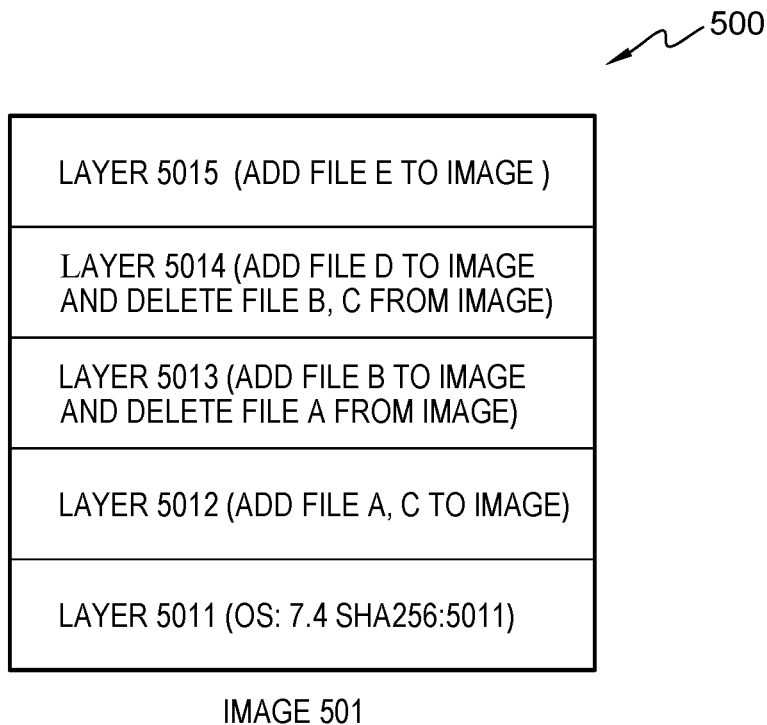
FIG. 5a depicts an exemplary image comprising a plurality of layers according to some embodiments of the present disclosure.
Figure 5B:
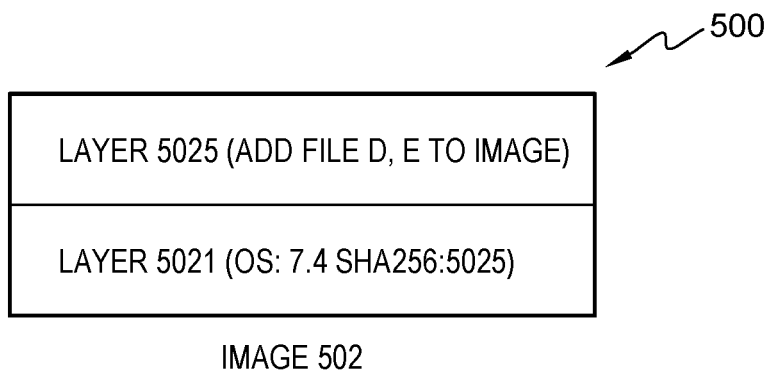
FIG. 5b depicts another exemplary image comprising a plurality of layers according to some embodiments of the present disclosure.

FIG. 5a and FIG. 5b depict exemplary usage environment 500 containing, image 501 and image 502, respectively. Image 501, an exemplary image, comprising a plurality of layers according to some embodiments of the present disclosure. When client 401 uploads image 501 to registry 402, layer 5011 of image 501 is first pushed to registry 402, e.g. content of layer 1001 are compressed and archived (e.g., tarball) and then uploaded to registry 402. Then layer 5012, layer 5013, layer 5014, and layer 5015 of image 501 are pushed to registry 402 sequentially, e.g. content of each corresponding layers is compressed, archived, and then uploaded to registry 402.

In an embodiment, image 501 is pushed to registry 402 by client 401 and responsively, layer manager 403 in registry 402 compresses, archives the content of the layer, and stores the archive to an address in layer storage 406. In addition, layer manager 403 can manage relationships between an identification (ID) of a layer and an address of the layer by generating mapping between the ID of the layer and the address of the layer. Generally, an ID of a layer comprises a collision resistant hash value of the content of the layer, while four digits are used to represent an ID of a layer for simplicity. Table 1 is an exemplary mapping between each ID of a layer and a corresponding address of the layer for image 501, as shown in FIG. 5a. In an embodiment, the address of a layer is a of address comprising a starting address and an end address, which indicates a logical or physical address range in which data of the layer are stored in layer storage 406. It could be understood that the relationship between each ID of a layer and a corresponding address of the layer can be expressed using other data structure, such as an XML file, a text file, a list or the like.

TABLE 1

| ID of layer | address of layer |
| --- | --- |
| 5011 | Address 1 |
| 5012 | Address 2 |

TABLE 1-continued

| ID of layer | address of layer |
| --- | --- |
| 5013 | Address 3 |
| 5014 | Address 4 |
| 5015 | Address 5 |

After all layers in image 501 are pushed into registry 402, the image manager 404 can create a layer manifest that references layers associated with image 501, then one or more clients can retrieve desired layers when pulling an image based on the layer manifest. In an example, the layer manifest of image 501 can be expressed as an XML file as below.

```
{
    "image name": "image 501"
    "Layers": [[5011, 5012, 5013, 5014, 5015]] //layer ID
}
```

It can be found, from the above the layer manifest of image 501, that image 501 comprises layer 5011, 5012, 5013, 5014, and 5015, respectively. It can be understood that the image manifest can be expressed using other data structure, such as table, a text file, a list, or the like.

When client 401 requests to pull (download) image 501 from registry 402, responsively, download manager 405 may return IDs of all layers of the image 501 to client 401. Then client 401 may check whether at least one layer is already available locally. If not, client 401 may request content of all layers from download manager 405 by sending IDs of all layers of the image 501 to download manager 405. Afterwards, download manager 405 downloads and extracts content of all layers from layer storage 406 in registry 402 to client storage. If some layers among all layers exist in client 401, but remaining layer(s), excluding the some layers from all layers, do not exist in client 401, client 401 may request content of the remaining layer(s) from download manager 405 by sending ID(s) of the remaining layer(s) of image 501 to download manager 405. Then download manager 405 may download and extract content of the remaining layer(s) from layer storage 406 in registry 402 to client storage.

Suppose that layer 5011 is obtained by adding a file from OS: 7.4, which is a system level layer, layer 5012 is obtained by adding files a, c to image 501, layer 5013 is obtained by adding file b to image 501 and deleting file a from image 501, layer 5014 is obtained by adding file d to image 501 and deleting files b, c from image 501, and layer 5015 is obtained by adding file e to image 501. In other words, image 501 composes files d and e last. FIG. 5b depicts exemplary image 502 comprising a plurality of layers according to some embodiments of the present disclosure. Image 502 comprises layers 5021 and 5025. Suppose that layer 5025 is obtained by adding files d and e to image 502. It can be found that layers 5011, 5012, 5013, 5014, and 5015, in image 501, are equivalent to layers 5021 and 5025, in image 502, since each of two images composes files d and e as well as the file from OS: 7.4 after being merged finally. Stated differently, the content of both images is the same. When a client downloads image 502, it will save time if client can download layers 5021 and 5025 instead of layers 5011, 5012, 5013, 5014, and 5015, because the size of the latter is much smaller than the size of the former, thus less time is needed for the transmission of content of layers over the network.

Thus, there is a need to find equivalent layers of an image to satisfy a user requirement when downloading the image. A policy-based layer managing method is proposed in the present invention.

Figure 6:
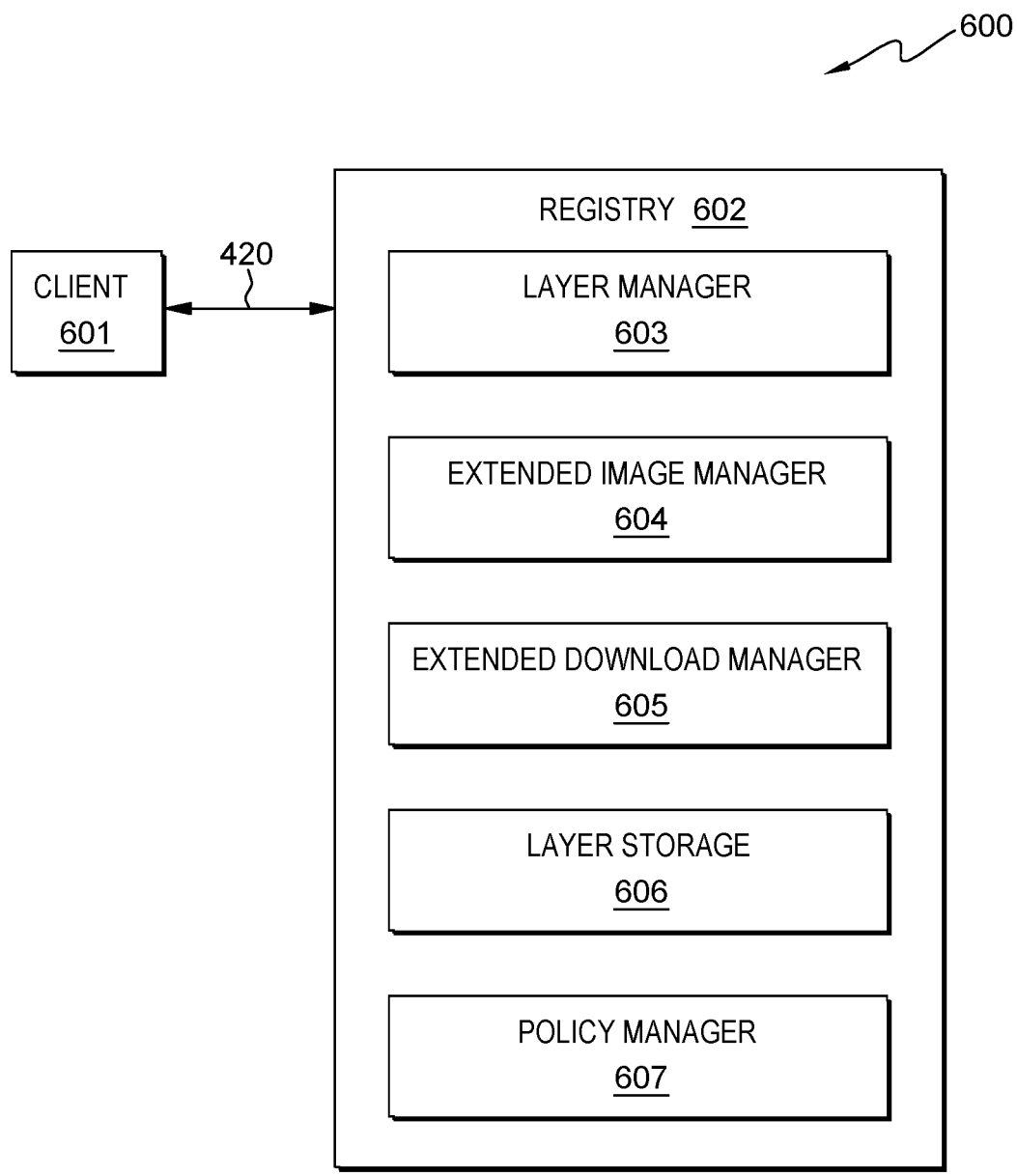
FIG. 6 depicts an exemplary usage environment of a multi-layer file system according to some embodiments of the present disclosure.

FIG. 6 depicts an exemplary usage environment 600 of a multi-layer file system according to some embodiments of the present disclosure. Usage environment 600 comprises a client 601 and a registry 602. Client 601 and registry 602 are connected directly or indirectly via communication network 420. A user may push (upload) images to registry 602 or pull (download) images from registry 602. Registry 602 may include layer manager 403, extended image manager 604, extended download manager 605, layer storage 406, and policy manager 607. The same reference numbers, in both FIG. 4 and FIG. 6, indicate the same components.

It may be appreciated that FIG. 6 provides only an illustration of one implementation and does not imply any limitations with regard to the environments in which different embodiments may be implemented. Many modifications to the depicted environments may be made based on design and implementation requirements.

In an example, client 601 may upload image 501 to registry 602. Layer manager 403 may build relationship between an ID of each layer and a corresponding address of each layer for image 501, as shown in Table 1. Layer manager 403 may also compress and archive content of each layer and store the archive to the stored address in layer storage 406. In some embodiments, extended image manager 604 can calculate a digest of content of image 501 (e.g. hash value in some cases or other value known by those skilled in the art) and determine a composition of layers of the first image. A group of layers associated with image 501 is referred as a composition of layers, a composition of layers can be expressed as a plurality of identifications (ID) of layer. For example, a composition of layers of image 501 can be expressed as [5011, 5012, 5013, 5014, 5015]. In some embodiments, extended image manager 604 can also create a layer manifest that references various compositions of layers associated with image 501, where content of layers specified by each composition of layers of image 501 collectively constitute content of image 501, e.g. content of layers 5011, 5012, 5013, 5014, 5015 together are the same as content of image 501.

Afterwards, client 601 may upload image 502 to registry 602. In some embodiments, layer manager 403 may add relationship between an ID of each layer and a corresponding address of each layer for all layers in image 502 to Table 1 (not shown in Table 1) and compress, archive the content of each layer, and store the archive to an address in layer storage 406. In some embodiments, extended image manager 604 can calculate a digest of content of image 502 and determine a composition of layers of the second image, e.g. a composition of layers [5021, 5025]. In some embodiments, extended image manager 604 can also create a layer manifest that references various compositions of layers associated with image 502. The layer manifest of image 502 can be shown as below.

```
{
    "image name": "image 502"
    "Layers": [[5021, 5025]]
}
```

It should be understood that the layer manifest is for illustrative, other data structure can be used to represent the list of various compositions of layers, such as table, text file, etc.

Then extended image manager 604 may compare the digest of image 502 with digests of stored images and the composition of layers of image 502 with the plurality of compositions of layers of stored images respectively, for example, image 501. Since the digest of image 502 is the same as the digest of image 501 but the composition of layers of image 502 is different from the composition of image 501, extended image manager 604 may add the composition of layers [5021, 5025] of image 502 to the layer manifest of image 501, then the resulting layer manifest of image 501 can be as following:

```
{
    "image name": "image 501"
    "Layers": [[5011, 5012, 5013, 5014, 5015], [5021,5025]]
}
```

In addition, extended image manager 604 may add the composition of layers [5011, 5012, 5013, 5014, 5015] of image 501 which is not included in the layer manifest of image 502 to the layer manifest of image 502. Thus, the resulting layer manifest of image 502 can be as following:

```
{
    "image name": "image 502"
    "Layers": [[5021,5025], [5011, 5012, 5013, 5014, 5015]]
}
```

In some embodiments, when registry 602 receives a request for downloading an image, such as image 501. The request may comprise a download policy requiring or emphasizing that a minimal (i.e., least number of possible layers) or reduced (e.g., 2 layers compared to 5 layers) number of layers to be downloaded be or a size of the content to be downloaded is as compacted, compressed, or reduced as permitted by a system; or any other predefined policy supported by registry 602. In an embodiment, increasing the number of layers decreases the size of the content to be downloaded. In another embodiment, associated networking status (e.g., network paths, available bandwidth, client storage constraints, etc.) of client 601 determines or modifies the download policy. All download policies supported by registry 602 can be managed by the policy manager 607. Client 601 can query the policies. In this embodiment, the request does not comprise any identifications of layers of any layers included in the first image. In other words, there is no existing layer in client 401.

In an example, suppose that the download policy is that size of content to be downloaded is as small as possible. Then extended download manager 605 may first obtain the layer manifest of image 501. As described above, the layer manifest of image 501 comprises two compositions of layers, e.g. [5011, 5012, 5013, 5014, 5015] and [5021, 5025]. Extended download manager 605 may first determine the size of layers for each composition of layers, for example, the size of composition of layers [5011, 5012, 5013, 5014, 5015] is X1, and the size of composition of layers [5021, 5025] is X2. As X1>X2, extended download manager 605 then determines that the second composition of layers, e.g. [5021, 5025] satisfies the download policy. Then extended download manager 605 may extract content of the corresponding layers specified by the selected composition of layers [5021, 5025] to client.

In another example, suppose that the download policy is that number of layers to be downloaded is as few as possible.

Then extended download manager 605 may first obtain the layer manifest of image 501. As described above, the layer manifest of image 501 comprises two compositions of layers, e.g. [5011, 5012, 5013, 5014, 5015] and [5021, 5025]. Extended download manager 605 may first count the number of layers to be downloaded for each composition of layers, e.g. 5 layers and 2 layers respectively in this example. As 5>2, extended download manager 605 then determines that the second composition of layers, e.g. [5021, 5025], satisfies the download policy. Then extended download manager 605 may extract content of the corresponding layers in the determined composition of layers [5021, 5025] to client.

In some embodiments, after selecting a composition of layers adapted to a download policy for image 501, a relationship between the selected composition of layers and the corresponding download policy for image 501 can be stored by extended download manager 605. In this way, when extended download manager 605 subsequently receives a new similar request, extended download manager 605 can determine the selected composition of layers from the stored results directly instead of re-computing to select a composition of layers. Registry 602 can also offline request/retrieve the relationship between each selected composition of layers and a corresponding download policy for any image stored in registry and then store the relationship for further use.

In some embodiments, the request from client 601 also comprises at least one identification (ID) of at least one existing layer in client 601 side, content of the existing layers need not to be downloaded to client 601. If it is determined that the selected composition of layers comprises the at least one ID of the at least one existing layer, extended download manager 605 can send content of the layers specified by the selected composition of layers but excluding the at least one existing layer. For example, if the composition of layers [5012, 5014, 5015] is the selected composition of layers, in which layer 5014 is obtained by adding file d and layer 5015 is obtained by adding file e, and layer 5014 is the existing layer in client 601, then extended download manager 605 can just send content of layers 5014 and 5015 to client 601. In some embodiments, if it is determined that the selected composition of layers do not comprise any ID of the at least one layer ID of the at least one existing layer, then extended download manager 605 can send content of all layers specified by the selected composition of layers. In another example, if the composition of layers [5021, 5025] is the selected composition of layers, and layer 5014 is the existing layer in client 601, then extended download manager 605 can send content of layers 5021 and 5025 to client 601, although the download content of layer 5025 include duplicated files in layer 5025.

In this way, those skilled in art may find that the transmission time can be saved when downloading an image if applying the download policy of size of content to be downloaded being as small as possible. Additional benefit is achieved when another download policy is applied.

Figure 7:
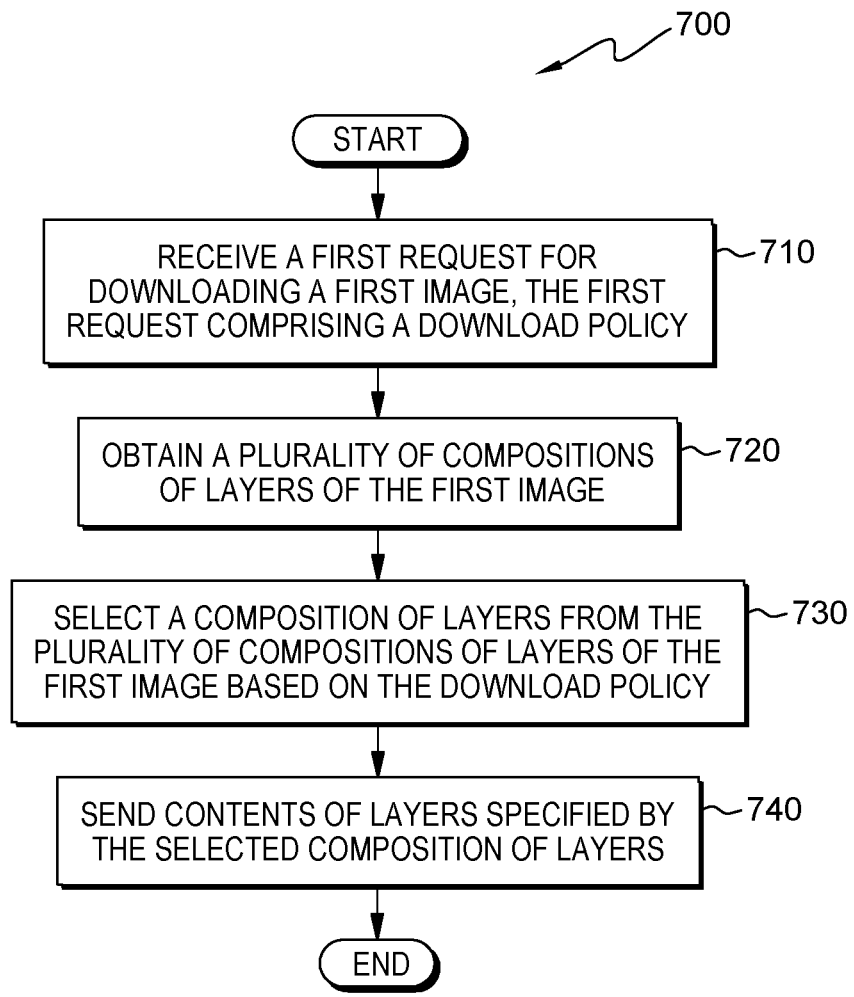
FIG. 7 depicts an operational flowchart for managing images in a registry constructed as a multi-layer file system according to some embodiments of the present disclosure.

Referring to FIG. 7, an operational flowchart 700 for managing images in a registry constructed as a multi-layer file system is depicted according to some embodiments of the present disclosure. The method can be implemented by a registry constructed as a multi-layer file system by interacting with a client. According to the method, at step 710, a registry receives a first request for downloading a first image, the first request comprising a download policy. For example, the first request from client 601 is for downloading image 501 in registry 602. The download policy can be that number of layers to be downloaded is as few as possible or size of content to be downloaded is as small as possible or any other download policies supported by registry 602. In addition, the request does not comprise any identification of any existing layers included in client 401. In other words, there is no existing layer in client 401.

At step 720, registry obtains a plurality of compositions of layers, where content of layers specified by each composition of layers collectively constitute content of the first image. In the example of image 501, as shown above, two compositions of layer of image 501 are obtained by registry 602.

At step 730, registry selects a composition of layers from the plurality of compositions of layers of the first image based on the download policy. Still in the above example, suppose that the download policy is that number of layers to be downloaded is as few as possible, then the composition of layers [5021, 5025] is selected.

At step 740, registry sends content of layers specified by selected composition of layers. In some embodiments, the download policy can be that number of layers to be downloaded is as few as possible or size of content to be downloaded is as small as possible or any other download policies supported by registry. In some embodiments, registry implementing flowchart 700 may records relationship between each selected composition of layers and a corresponding download policy for the first image so that the composition of layers corresponding to a download policy can be selected directly for a next request.

In some embodiments, each composition of layers is expressed as a plurality of identifications of layers, the first request also comprises at least one identification of at least one existing layer not to be downloaded to avoid two rounds of communication in existing technologies. If it is determined that the selected composition of layers comprises the at least one identification of the at least one existing layer, registry implementing flowchart 700 may send content of the layers specified by the selected composition of layers but excluding the at least one existing layer. In some embodiments, if it is determined that the selected composition of layers do not comprise any ID of the at least one identification of the at least one existing layer, registry implementing flowchart 700 may send content of all layers specified by the selected composition of layers.

In some embodiments, registry implementing flowchart 700, when receiving a second request for uploading a second image different from the first image (e.g. the first image and the second image may have different digests or may have the same digest but different composition of layers), may first determine a digest of content of the second image and a composition of layers of the second image. Afterwards, registry implementing flowchart 700 may compare the digest of the second image with digests of stored images and the composition of layers of the second image with the plurality of compositions of layers of the first image, respectively. Once registry implementing flowchart 700 determines that the digest of the second image is the same as digest of the first image but the composition of layers of the second image is different from any composition of the plurality of compositions of layers of the first image, registry may add the composition of layers of the second image to the plurality of compositions of layers of the first image and also add the plurality of compositions of layers of the first image to a plurality of composition of layers of the second image. In other words, both layer manifests of the first image and the second image are equivalent, e.g. sequence of the compositions of layer thereof may be not same, but the compositions of layer thereof are the same. In this way, all equivalent images can be found. Then when an image is requested to be downloaded using a download policy, an equivalent image satisfying the download policy can be downloaded instead of the original image to fulfill the user requirement, such as the transmission time for image can be saved.

It should be noted that the method or the system for managing images in a registry constructed as a multi-layer file system according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by one or more computer processors, a first request for downloading a first image, the first request comprising a download policy;
obtaining, by one or more computer processors, a plurality of compositions of layers of the first image, wherein content of layers specified by each composition of layers collectively constitute content of the first image;
selecting, by one or more computer processors, a composition of layers from the plurality of compositions of layers of the first image based on the download policy; and
sending, by one or more computer processors, content of layers specified by the selected composition of layers excluding the at least one existing layer in response to a determination that the selected composition of layers comprises the at least one identification of at least one existing layer.

2. The method of claim 1, wherein the sending content of the layers specified by the selected composition of layers comprises:
sending, by one or more computer processors, content of all layers specified by the selected composition of layers in response to the determination that the selected composition of layers does not comprise the at least one identification of at least one existing layer.

3. The method of claim 1, wherein the download policy dictates a number of layers to be downloaded or a size of the content to be downloaded.

4. The method of claim 1, further comprising:
receiving, by one or more computer processors, a second request for uploading a second image;
determining, by one or more computer processors, a digest of content of the second image and a composition of layers of the second image;
comparing, by one or more computer processors, the digest of the second image with digests of stored images and the composition of layers of the second image with the plurality of compositions of layers of the first image respectively;
adding, by one or more computer processors, the composition of layers of the second image to the plurality of compositions of layers of the first image in response to the digest of the second image being the same as digest of the first image but the composition of layers of the second image being different from any composition of the plurality of compositions of layers of the first image; and
uploading, by one or more computer processors, content of layers specified by the composition of layers of the second image.

5. The method of claim 4, further comprising:
adding, by one or more computer processors, the plurality of compositions of layers of the first image to a plurality of composition of layers of the second image in response to the digest of the second image being the same with the digest of the first image but the composition of layers of the second image being different from any composition of the plurality of compositions of layers of the first image.

6. The method of claim 1, further comprising:
recording, by one or more computer processors, a relationship between selected composition of layers and the download policy for the first image.

7. A system comprising:
one or more computer processors;
one or more computer readable storage media; and
program instructions stored on the computer readable storage media for execution by at least one of the one or more processors, the stored program instructions comprising:
program instructions to receive a first request for downloading a first image, the first request comprising a download policy;
program instructions to obtain a plurality of compositions of layers of the first image, wherein content of layers specified by each composition of layers collectively constitute content of the first image;
program instructions to select a composition of layers from the plurality of compositions of layers of the first image based on the download policy; and
program instructions to send content of layers specified by the selected composition of layers excluding the at least one existing layer in response to a determination that the selected composition of layers comprises the at least one identification of at least one existing layer.

8. The system of claim 7, wherein the program instructions to send content of the layers specified by the selected composition of layers comprise:
program instructions to send content of all layers specified by the selected composition of layers in response to the determination that the selected composition of layers do not comprise the at least one identification of at least one existing layer.

9. The system of claim 7, wherein the download policy dictates a number of layers to be downloaded or a size of the content to be downloaded.

10. The system of claim 7, wherein the program instructions stored on the one or more computer readable storage media further comprise:
program instructions to receive a second request for uploading a second image;
program instructions to determine a digest of content of the second image and a composition of layers of the second image;
program instructions to compare the digest of the second image with digests of stored images and the composition of layers of the second image with the plurality of compositions of layers of the first image respectively;
program instructions to add the composition of layers of the second image to the plurality of compositions of layers of the first image in response to the digest of the second image being the same as digest of the first image but the composition of layers of the second image being different from any composition of the plurality of compositions of layers of the first image; and program instructions to upload content of layers specified by the composition of layers of the second image.

11. The system of claim 10, wherein the program instructions stored on the one or more computer readable storage media further comprise:

program instructions to add the plurality of compositions of layers of the first image to a plurality of composition of layers of the second image in response to the digest of the second image being the same with the digest of the first image but the composition of layers of the second image being different from any composition of the plurality of compositions of layers of the first image.

12. The system of claim 7, wherein the program instructions stored on the one or more computer readable storage media further comprise:

program instructions to record a relationship between selected composition of layers and the download policy for the first image.

13. A computer program product comprising:

one or more computer readable storage media and program instructions stored on the one or more computer readable storage media, the stored program instructions comprising:

program instructions to receive a first request for downloading a first image, the first request comprising a download policy;

program instructions to obtain a plurality of compositions of layers of the first image, wherein content of layers specified by each composition of layers collectively constitute content of the first image;

program instructions to select a composition of layers from the plurality of compositions of layers of the first image based on the download policy; and program instructions to send content of layers specified by the selected composition of layers excluding the at least one existing layer in response to a determination that the selected composition of layers comprises the at least one identification of at least one existing layer.

14. The computer program product of claim 13, wherein the program instructions to send content of the layers specified by the selected composition of layers comprise:

program instructions to send content of all layers specified by the selected composition of layers in response to the determination that the selected composition of layers do not comprise the at least one identification of at least one existing layer.

15. The computer program product of claim 13, wherein the download policy dictates a number of layers to be downloaded or a size of the content to be downloaded.

16. The computer program product of claim 13, wherein the program instructions stored on the one or more computer readable storage media further comprise:

program instructions to receive a second request for uploading a second image;

program instructions to determine a digest of content of the second image and a composition of layers of the second image;

program instructions to compare the digest of the second image with digests of stored images and the composition of layers of the second image with the plurality of compositions of layers of the first image respectively;

program instructions to add the composition of layers of the second image to the plurality of compositions of layers of the first image in response to the digest of the second image being the same as digest of the first image but the composition of layers of the second image being different from any composition of the plurality of compositions of layers of the first image; and program instructions to upload content of layers specified by the composition of layers of the second image.

17. The computer program product of claim 16, wherein the program instructions stored on the one or more computer readable storage media further comprise:

program instructions to add the plurality of compositions of layers of the first image to a plurality of composition of layers of the second image in response to the digest of the second image being the same with the digest of the first image but the composition of layers of the second image being different from any composition of the plurality of compositions of layers of the first image.

* * * * *